Jan. 17, 1967 J. WILLY 3,298,884
METHOD OF MANUFACTURING REINFORCED
PLASTIC FOAM IN SHEET FORM
Original Filed April 25, 1961 4 Sheets-Sheet 3

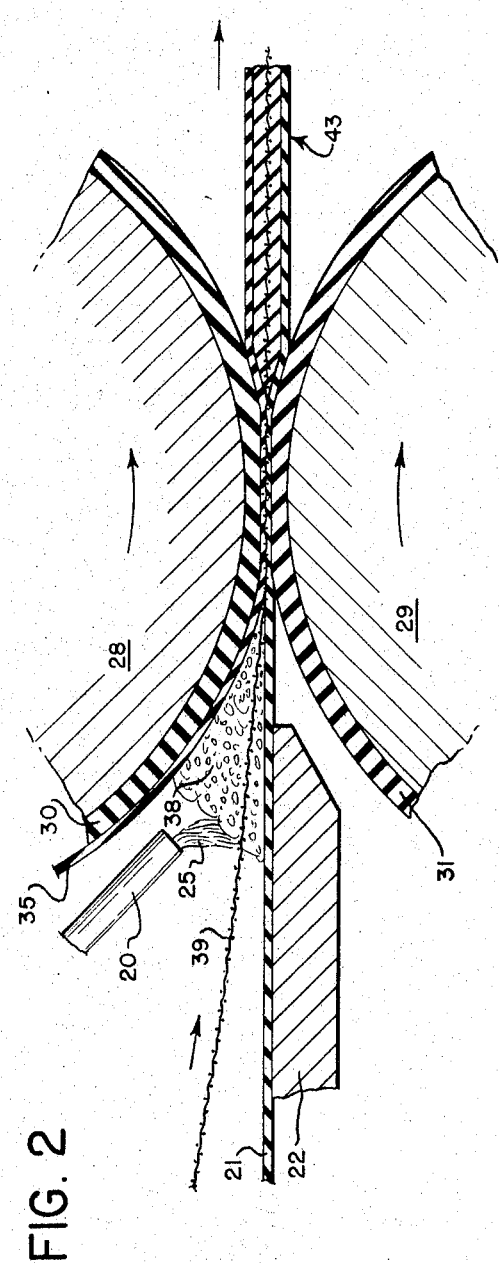
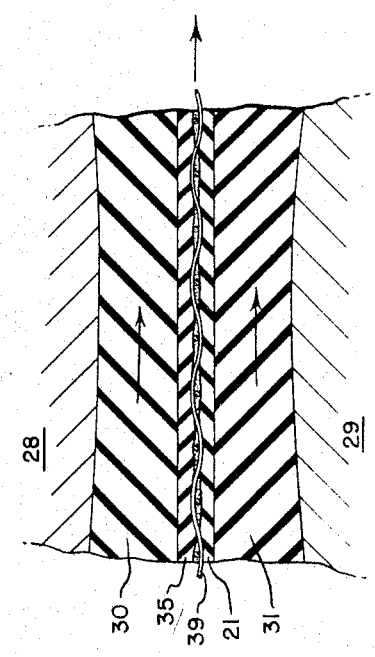
FIG. 2
FIG. 3
INVENTOR
John Willy

INVENTOR
John Willy
BY
ATTORNEYS

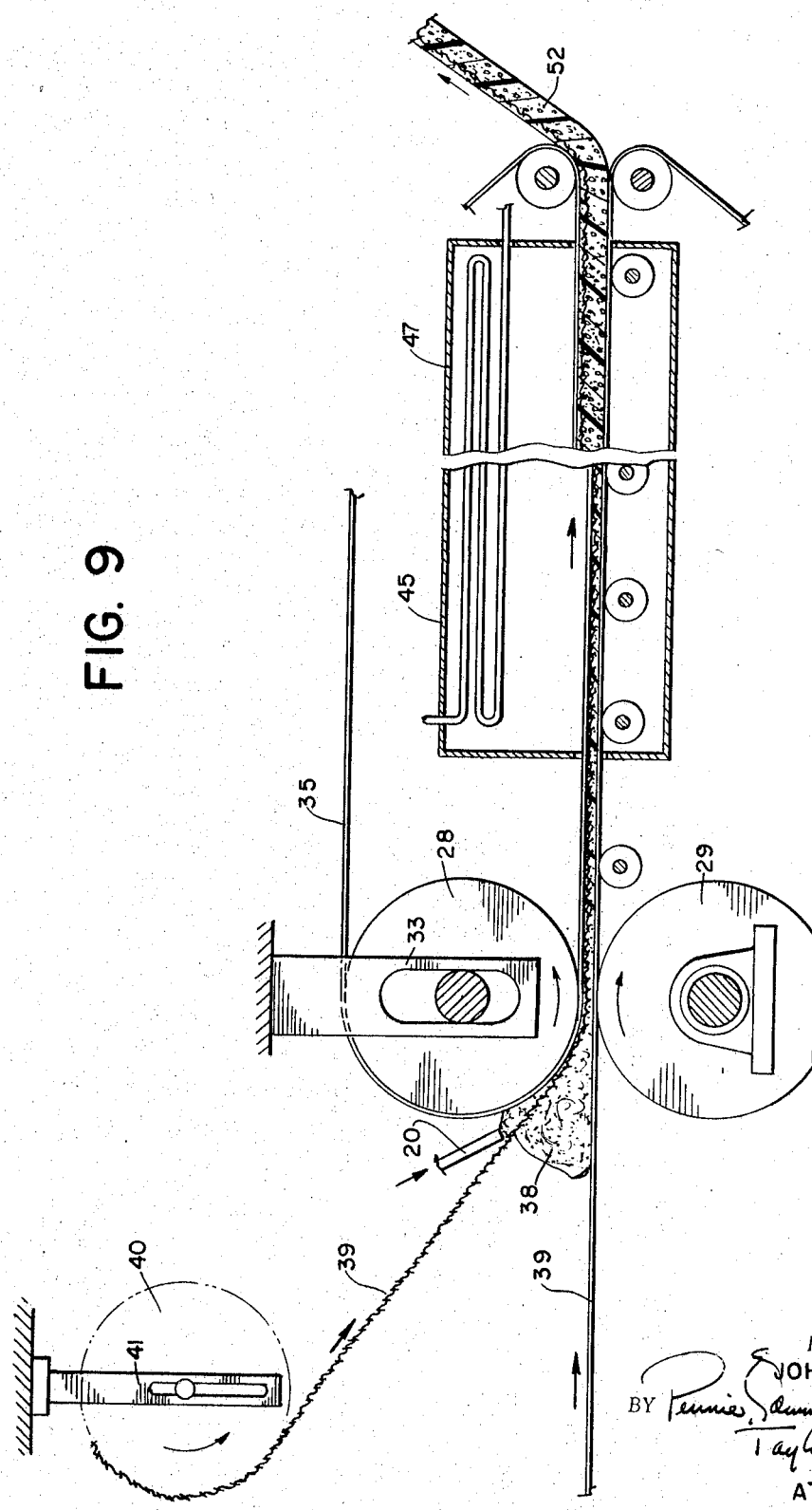

under nited States Patent Office 3,298,884
Patented Jan. 17, 1967

3,298,884
METHOD OF MANUFACTURING REINFORCED
PLASTIC FOAM IN SHEET FORM
John Willy, Attleboro, Mass., assignor to Specialty Converters, Inc., a corporation of Delaware
Filed Oct. 7, 1965, Ser. No. 493,641
3 Claims. (Cl. 156—79)

This is a continuation-in-part of my application Serial No. 388,970, filed April 30, 1964, which in turn is a divisional of my application Serial No. 105,372, filed April 25, 1961, now Patent No. 3,172,072, granted March 2, 1965.

This invention relates to reinforced plastic foam in sheet form and, more particularly, to a method and apparatus for making a unitary sheet of plastic foam having a discontinuous layer of reinforcing material embedded therewithin.

Plastic foams have found wide acceptance as shock-absorbing pads, electrical and thermal insulation, liquid absorbents, filler materials, and the like, but their low tensile strength renders them unsuitable for many uses where otherwise they could be of great advantage. This is especially true of flexible or semirigid foams, but applies oftentimes to rigid foams as well. A distinct need exists, therefore, for a plastic foam material, particularly in economical sheet form, which has all the advantages of ordinary foam but is capable of bearing tensile loads in one or more directions without tearing or perhaps without even stretching. The broad purpose of this invention is to provide reinforced plastic foam sheet which achieves these ends.

Typical known designs of reinforced plastic foam sheets are of laminated or composite construction wherein separate foam sheets are adhered together with a reinforcing material between them. Such sheets are considerably more costly than ordinary foam, of course, because the laminating process is entirely separate from the manufacture of the two or more individual component sheets. Also, the presence of an adhesive in the composite product sometimes renders the product less resilient and flexible, more dense, less absorbent, etc. than ordinary homogeneous foam. Consequently, the reinforced foam sheets available heretofore have been relatively expensive specialty products which are far less versatile than plain foam sheets.

The foamed plastic product made by the method and with the apparatus of this invention comprises a unitary sheet of plastic foam of great breadth and length relative to its thickness. The sheet has a unitary and continuous cellular structure throughtout with a relatively coarse-pore internal structure throughout its thickness except immediately adjacent its broad surface faces and having at such faces a skin of relatively fine-pore structure integral with said internal structure and forming a substantially smooth continuous even integral surface film resistant to penetration of surface coatings applied thereto. A flexible discontinuous reinforcing layer comprising spaced filamentary reinforcing elements is disposed within said sheet between and substantially parallel to the broad faces thereof. The body of the sheet is foamed in situ integrally through the interstices between the reinforcing elements and possesses substantially the same pore structure within such interstices as on opposite sides of the reinforcing elements. The discontinuous layer of reinforcing material may be of many forms, perhaps an open mesh screen or a number of parallel strands laid side-by-side, or a mat of at least one randomly looped strand. These strands may bend easily so as to render the sheet practically as flexible as any unreinforced foam, or they may be self-supporting so that the new reinforced foam can be formed into and hold any shape. Furthermore, the strands may be of metal, or they may be non-metallic and perhaps stretchable longitudinally to a certain extent if desired. The reinforcing layer may also comprise at least one electrically conductive wire laid without crossing in contact with itself, so that with electrical connecting means at the opposite ends of the wire such a sheet may provide an electrical heating pad. Also, the new foamed plastic sheet has an integral skin layer on both of its broad faces, and this skin has a substantially finer exterior pore structure than the interior pore structure within the sheet.

It is important to note that, whatever the form of the discontinuous layer of reinforcing material may be, the cellular structure of the foam is entirely unitary and extends integrally through the reinforcing layer and around the strands thereof. Consequently, the new product is a single sheet possessing substantially all the advantages of ordinary foam, from the standpoint both of cost and physical properties, except that it will not tear when subjected to tension or shear forces in one or more directions.

The method is in combination with one of making a unitary single sheet of flexible polyurethane foam which has a unitary and continuous cellular structure throughout wherein a liquid polyurethane foaming mixture is continuously prepared and chilled below room temperature to a temperature at which it will not react to delay foaming thereof. The chilled mixture is spread onto a moving flexible carrier web and a moving flexible covering web is directed over the foam mixture to position the mixture between the carrier and covering webs. A uniform thickness of chilled foam mixture is fixed between the carrier and covering webs; the temperature of the foam mixture is raised to react the mixture and form a foam sheet between the webs; the webs with the foam therebetween are directed into a preliminary heat curing zone; the carrier and covering webs are separated from the foam sheet, and the foam sheet is directed to a final curing operation. The improvement is in reinforcing the foam sheet with a flexible discontinuous reinforcing layer embedded within the foam sheet and extending substantially parallel to the broad faces thereof. It comprises the steps of feeding a discontinuous layer of spaced reinforcing strands into the chilled foaming mixture, controlling the angle of entry of said reinforcing material into said chilled foam mixture in relation to its position between the broad faces of the sheet to determine its final position between the broad faces of the sheet, compressing the carrier and cover sheets toward each other to squeeze excess mixture from between the webs and force the remainder of the mixture fully through and around the strands of said reinforcing layer before foaming of the mixture to fill the interstices and coat the strands with said foaming mixture and thereby entirely enclose the reinforcing layer in the foaming mixture, thereafter freeing the webs from the squeezing action to allow the mixture therebetween to foam, moving the webs reinforcing layer and foam mixture together at a constant rate, and foaming the mixture in situ into a unitary foamed sheet integrally about and penetrating the interstices between the reinforcing strands so that it possesses substantially the same pore structure within such interstices as on the opposite sides of the reinforcing elements.

Preferably, the flexible carrier and covering webs may be directed into rolls to be pressed together, as described. Also, the angle of entry of the reinforcing material into the rolls may be varied in order to control the location of the reinforcing material between the broad faces of the finished sheets. The pressure of the rolls on the webs may be controlled too in order to determine the amount of mixture remaining between the webs, which in turn determines the thickness of the finished sheets.

The apparatus used for making the sheets of reinforced foamed plastic is of the type which has a pair of flexible webs movable together one over the other and defines opposed forming surfaces releasable with respect to said foamed plastic feeding means for disposing a layer of liquid foaming mixture between said surfaces and means permitting substantially free separation of the webs after rolling so that the remaining mixture foams therebetween about said reinforcing material, and displacement means for removing the web from the finished foam. The improvement is in combination with this apparatus and comprises means for feeding a discontinuous layer of reinforcing material between the surfaces and into the chilled mixture and a pair of rolls having a resilient surface for forcing the webs together to squeeze the excess mixture from between the forming surfaces and force the remaining mixture fully through and around the strands of the reinforcing material before foaming of the mixture to fill the interstices and coat the strands with said foaming mixture and thereby entirely enclose the reinforcing layer in the foaming mixture.

A preferred embodiment of the invention is described hereinbelow with reference to the accompanying drawings, wherein FIG. 1 is a schematic elevation of the new apparatus;

FIG. 2 is an enlarged fragmentary section of the carrier and covering webs, reinforcing material and liquid foaming mixture entering the rolls;

FIG. 3 is a section enlarged over FIG. 2 and showing the compressed elements between the rolls;

FIG. 9 is a side elevation partly in section showing reinforcing material being fed at an angle for positioning the reinforced material near the top surface of the foam sheet.

Figure 1:
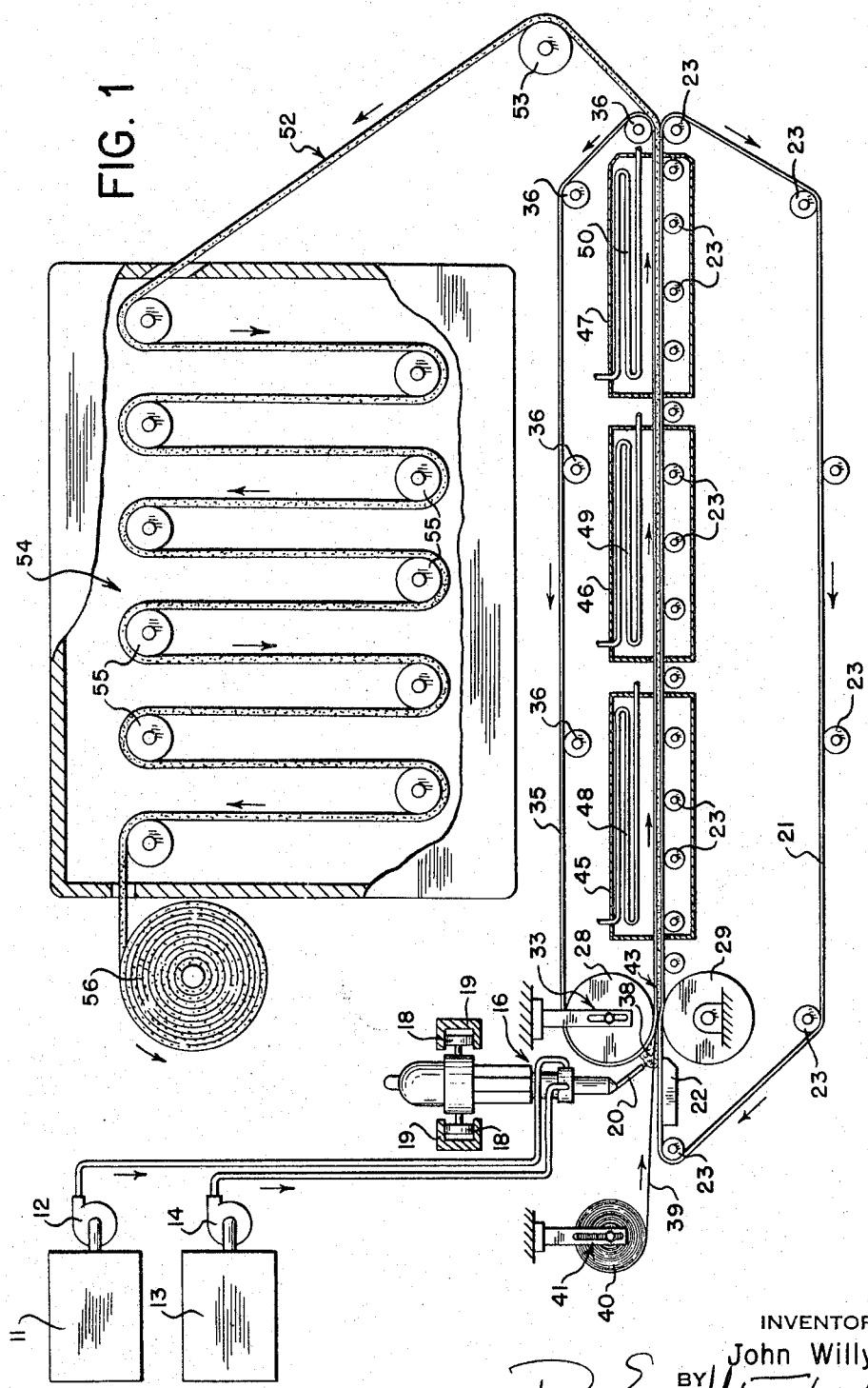

A common type of commercial plastic foam currently produced is polyurethane foam which is formed from a polyisocyanate (especially toluene diisocyanate) and a hydroxyl-containing compound (e.g. glycols, polyols, polyesters, or polyethers). The particular composition of a given polyurethane foam varies widely depending upon the properties desired, such as density, tensile strength, tear strength, flexibility, cell size, and so on. For purposes of example, one specific flexible foam is described herein, though it is to be understood that the invention includes many other flexible foams within its scope, and also semi-rigid or rigid foams.

It is intended that any of the foaming mixtures of the type described in U.S. Patent 2,956,310 can be used in this invention. In a first example 95 grams of an 80-20 mixture of the 2, 4, and 2, 6 isomers of toluene diisocyanate were placed in a reaction vessel. To the toluene diisocyanate there were added 450 grams of polypropylene glycol, having an average molecular weight of 2000. The materials reacted with the evolution of heat, and mixing was continued until a temperature peak was reached, and then dropped back to about 9° F., at which time the mixture was heated with stirring to a temperature of 284° F. The mixture was then cooled to 122° F. Further toluene diisocyanate, to the extent of 82 grams was added with stirring to bring the free NCO group content up to about 10%. To the resulting prepolymer mixture, 3 grams of a fluid silicone oil of 50 centistokes at 77° F. viscosity was added and mixed in. The resultant batch weight was about 627 grams.

A catalyst mixture was then prepared by mixing into 23 grams of cold distilled water 5.0 grams of triethylene diamine and 10.0 grams of N,N,N',N tetramethyl 1,3 butanediamine.

The prepolymer mixture was cooled to a temperature of 20° F. in a separate reservoir as will be described and to 100 grams of the cold prepolymer was added 3.85 grams of the catalyst mixture and the two were rapidly, but thoroughly intermixed for dispensing from, for example, a mixing head, as below.

In a second example, a pre-mixed resin is used comprising two component polyether-based prepolymer systems, e.g. a prepolymer of toluene diisocyanate and an organic compound having two or more diisocyanate reactive groups, with an excess of toluene diisocyanate. (Such a resin is commercially available under the tradename Isofoam L-128 manufactured by Isocyanate Products, Inc. of Wilmington, Delaware.) To 100 parts by weight of this pre-mixed resin is added 0.5 part by weight of silicone oil, and this prepolymer mixture is placed in a reservoir 11 associated with a pump 12 in the apparatus shown in FIG. 1. A catalyst mixture is then prepared and placed into a reservoir 13 associated with a pump 14; this catalyst mixture comprises 0.5 part by weight of triethylene diamine dissolved in 1.3 parts by weight of N,N,N, tetramethylbutane diamine and 2.0 parts by weight of distilled water. Under certain circumstances, Freon may replace the water content.

The pumps 12 and 14 deliver their respective reactants continuously to a conventional mixing head 16 at accurately determined rates. The speed of the pump 12 is adjusted to give a discharge rate of just slightly less than the total discharge of liquid foaming mixture desired from the foaming head 16, and the speed of the catalyst 14 is then adjusted accordingly to give a discharge rate of 3.8 percent of that established in the pump 12.

The preparation of the foam-forming reactants in this manner is within the knowledge of the art and is not itself a part of this invention. Thus, the prepolymer components may be separately stored and pumped rather than pre-mixed as described above, in which case a third reservoir and pump would be provided. Pigments may also be added as desired to color the foamed sheet product, but it should be noted that they must either be dehydrated or of closely controlled moisture content in order to not unbalance the crucial water content of the mixture.

Suitable cooling coils are included in each of the tanks 11 and 13 and also in association with the mixing head to insure that the mixture is chilled below room temperature to further delay foaming. Advantageously, each of the primary ingredients is chilled to 20° F. in the tank, and they should be no warmer than 50° F. after being dispensed from the head 16.

The mixing head 16 is supported by a suitable traversing mechanism, including for example rollers 18 and tracks 19, enabling it to be oscillated slowly back and forth in a direction perpendicular to the plane of the drawing in FIG. 1. As the head 16 indexes back and forth, the liquid polyurethane foaming mixture described above flows from its nozzle through a curved guide tube 20 and onto the upper or carrier surface of a carrier web 21 which moves over a table 22 in a direction at right angles to the traversing motion of the head 16. The upper surface of the carrier web 21 is coated with a release agent (such as silicone rubber, polyethylene, wax or polytetrafluoroethylene) and the web body behind this release agent may be woven fabric, thin sheet metal, or any other suitable flexible sheet. As shown in FIG. 1, the carrier web 21 is endless and passes over a series of supporting rolls 23, at least some of which are also driving rolls which advance the web 21 in the direction of the arrow at a uniform rate.

In FIG. 2, a stream 25 of the foaming mixture is shown flowing downwardly from the head 16 onto the carrier web 21 which moves over the table 22. The head 16 is traversed back and forth at a sufficient rate (say 360 degrees per minute) so that a sufficiently thick layer of the foaming mixture is applied to the carrier web 21. After leaving the table 22, the carrier web 21 enters a pair of opposed doctoring rolls 28 and 29 which are advantageously coated with layers 30 and 31 respectively of rubber or other resilient material. As shown in FIG. 1, the upper roll 28 is mounted on an adjustable support 33 which permits the distance between its axis and the axis of the lower roll 29 to be varied as desired. This allows adjustments ranging from a wide gap between the rolls to tight contact between their resilient surfaces.

As the carrier web 21 is drawn between the rolls 28 and 29, it comes in opposition with the underside of a covering web 35 which is directed around the upper roll 28. The covering web 35 is also an endless belt, and like the carrier web 21 may be coated with a release agent. It too is supported and driven by a plurality of rolls 36. This construction permits the carrier web 21 to be moved together with the covering web 35 in direct surface-to-surface opposition relative thereto.

Advantageously, the release agent and backing material of the webs 21 and 35 are resilient and compressible so that the webs can be squeezed together and advanced through the rolls 28 and 29 even when the roll gap is zero, i.e. surface-to-surface contact. However, depending upon the thickness of the desired foamed sheet, the roll 28 may be raised or lowered by means of the adjustable support 33 to vary the roll gap and increase or decrease the thickness of the resulting sheet. Very little mixture is necessary between the webs to produce a sheet of substantial thickness; for example, a roll gap of only .020 inch will produce a sheet ½ inch thick when the foaming mixture described previously is used. As shown in FIG. 2, a bead 38 of excess foaming mixture is continuously squeezed forward in front of the rolls 28 and 29 so that just the desired amount of mixture remains between the webs to foam into a sheet of the predetermined thickness.

Also directed between the rolls 28 and 29 is a discontinuous layer of reinforcing material 39 which is fed from a supply roll 40. This reinforcing material may vary widely as is described hereinbelow, but for purposes of this example it may be said to be an open mesh screen of saran strands. (Saran is a thermoplastic resin obtained by the polymerization of vinylidene chloride or copolymerization of vinylidene chloride with lesser amounts of other unsaturated compounds.) The screen is drawn between the rolls 28 and 29 by the webs 21 and 35, and under the pressure of the rolls the remaining liquid foaming mixture between the webs is forced fully through the open mesh of the screen and around the individual strands thereof. This entirely encloses the reinforcing material in the foaming mixture.

In FIG. 3, the elements between the rolls are shown in typical tight compression. It will be noted that under such heavy roll pressure the webs 21 and 35 are squeezed to the point where their adjacent surfaces actually conform somewhat to the irregular surface of the reinforcing material 39, leaving very little of the foaming mixture therebetween and insuring that the small remaining amount is forced fully around the strands of the reinforcing material 39.

In one example, the rolls were set to provide a clearance of 0.004 inch between the carrier web 21 and the covering web 35 at the nip of the rolls with a reinforcing material having a thickness of 0.007. There was a negative roll gap and the reinforcing material could pass through the metering section only because of the resiliency of the rolls and the compressibility of the reinforcing sheet. Using the first example of the foam mixture described a foam sheet having a thickness of ³⁄₁₆ inch was formed.

In another example, also using the first example of foam mixture described with a reinforcing material having a thickness of 0.007 a clearance of 0.004 more than the thickness of the reinforcing material was maintained between the carrier web 21 and the covering web 35 and the foam sheet formed had a thickness of ⁵⁄₁₆ inch.

It has been found that the final position of the reinforcing layer between the broad faces of the finished strip may be controlled by adjusting the angle of entry of the reinforcing material into the rolls 28 and 29. In other words, if the reinforcing material 39 enters the rolls at the angle shown in FIG. 2 relative to the carrier web 21, it will have a certain location between the broad faces of the finished foamed sheet. If this angle is increased such that the reinforcing material 39 is initially directed closer to the covering web 35 and more remote from the carrier web 21, then the reinforcing material will be closer to the upper broad face of the finished foam sheet. The converse, of course, is equally true. Apparently, this happens because more or less of the foaming mixture is situated on one or the other side of the reinforcing material 39 between the rolls 28 and 29 depending upon the initial angle of entry of the reinforcing material into the rolls. In order to make these adjustments, the supply roll 40 of the reinforcing material 39 may be raised or lowered as desired by the adjustment means 41 shown in FIG. 1. At the angle shown in FIG. 2, the reinforcing material was wetted by the foaming mixture equally at both the top and bottom, and this resulted in a product in which the reinforcing layer was substantially in the center of the foam and substantially parallel to the broad faces. Referring to FIG. 9, the supply roll 40 has been raised to increase the angle of entry relative to the horizontal carrier belt. Here the reinforcing material 39 came into light contact with the covering web with the major rolling bank of foaming mixture below the part of level of the reinforcing material. With this adjustment, the foaming mixture was disposed substantially as the lower side of the reinforcing material; thus, the foam sheet formed had the reinforcing layer located near and parallel to the surface face of the foam sheet. Therefore, by regulation of the angle of entry of the reinforcing material into the nip of the roller in conjunction with the control of its tension against the cover sheet, the position of the reinforcing layer could be varied from adjacent the broad surface of the sheet to various depths into the center.

Shortly after leaving the rolls 28 and 29, the foaming mixture begins to expand and form a foam structure as shown at 43 in FIG. 2. The webs 21 and 35 are free to move apart at this time so that the foaming takes place with relatively little resistance. It is characteristic of the invention that as the mixture starts to foam, the cellular structure is generated in situ about the open mesh of the reinforcing screen on both sides thereof so that a completely unitary foam sheet is created around the reinforcement.

Moving together at a constant rate, for example 20 feet per minute, the webs 21 and 35 then carry the newly-formed foam into a preliminary heat-curing stage of three separate heating zones. These comprise three covers 45, 46, and 47 extending perhaps half a foot above the webs and enclosing steam heating coils 48, 49, and 50 respectively which elevate the temperature therein to three successively higher levels. With the particular foam sheet product described herein, these covers may each be about 20 feet long and maintain temperatures of 125° F., 180° F., and 245° F. respectively. Taken with the 20 foot per minute advance of the webs 21 and 35, these temperatures and distances leave the polyurethane foam in a semi-cured but self-supporting condition upon emerging from the end of the last cover 47.

At that exit point, the endless webs 21 and 35 leave the partly cured reinforced foam sheet (indicated at 52 in FIG. 1), and the sheet passes over an idler roll 53 and moves into a final heat-curing oven 54. During the final heat-curing the reinforced foamed sheet 52 advances over a series of festoon rolls 55 until it is fully cured. Upon emerging from the final heat-curing oven 54 the finished sheet is wrapped up about an end product roll 56.

Referring now to FIGS. 4–8, enlarged views of various embodiments of reinforced foam according to the invention are shown. In each of them, the flat broad faces of the sheet have a distinctive skin-like surface of considerably finer exterior pore structure than the interior foamed structure within the sheet. This is because the cellular structure at these broad faces is generated while in contact with the carrier and covering webs 21 and 35 respectively and thus cannot foam to the full porosity achieved elsewhere in the sheet. This gives a very pleasing appearance and a good feel to the sheet product and provides a surface somewhat more resistant to tearing.

Figure 4:
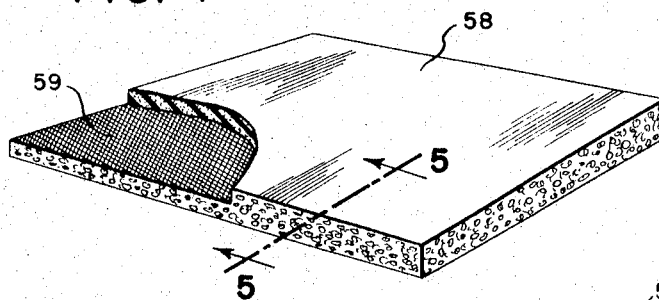
FIG. 4 is a perspective view partly broken away of one embodiment of the new reinforced foam sheet.

In FIG. 4, the product comprises a unitary polyurethane sheet 58 foamed integrally about an open mesh 59. Again, this mesh 59 may be of various strand material, such as the saran fibers described previously, monofilaments of fiber glass or nylon or any other suitable plastic material, metal wire, natural fibers of cotton or jute or the like, or various other yarns whether twisted or stranded, etc. Its weave may be perpendicular or on the bias with respect to the longitudinal axis of the indefinite length sheet made according to the method and apparatus of FIGS. 1 and 2. The primary characteristic of this reinforcing layer and all the others described herein is that it is discontinuous so that the foam structure may form completely and integrally therethrough and around the strands thereof. Thus, the open mesh 59 may be a plurality of unwoven crisscrossed wires whether adhered together or not, or a flexible length of perforated sheet material, or any other reinforcing sheet-like article having interstices through which the foam can generate.

Figure 5:
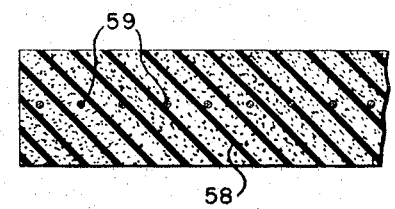
FIG. 5 is an enlarged section taken along the line 5—5 in FIG. 4.

FIG. 5 is an enlarged edge view of the FIG. 4 product; it shows the reinforcing screen 59 spaced about midway between the broad faces of the sheet, though it could be closer to one or the other of them depending upon its initial angle of entry into the rolls. This section also shows the unitary cellular structure extending fully through the reinforcing layer and around the strands thereof.

Figure 6:
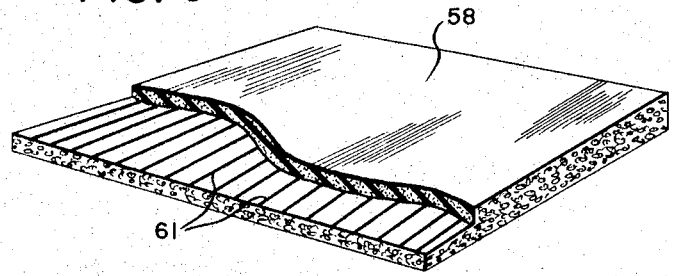
FIG. 6 is a perspective view partly broken away of another embodiment of the new product.

FIG. 6 shows an embodiment of the product wherein a plurality of parallel wires 61 make up the reinforcing layer. These wires are laid side-by-side and may be directed from an array of spools positioned much like the supply roll 40 and fed into the rolls 28 and 29. It is characteristic of the FIG. 6 product that it resists stretching when pulled longitudinally because of the strands 61, but when pulled laterally with respect to the strands it stretches easily. Even in the longitudinal direction of the strands, some stretching may be provided, as with saran fibers which may stretch up to 18 percent before failing.

Figure 7:
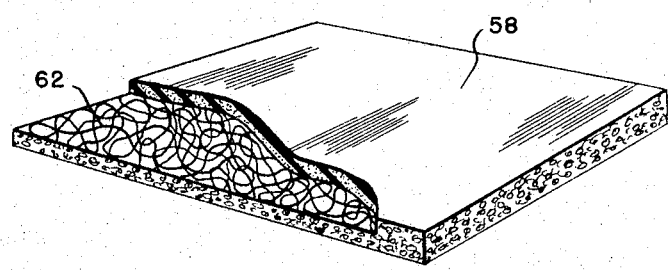
FIG. 7 is a perspective view partly broken away of a third embodiment of the new sheet.

Turning now to the embodiment of FIG. 7, the unitary polyurethane foamed sheet there includes a layer of reinforcing material made up of one or more randomly looped strands 62 disposed in a mat. Again, the particular filament used for this mat can vary. This reinforcing layer does not withstand tension during its manufacture, of course, and thus must be laid directly on the carrier web 21 rather than pulled tightly between the webs by the rolls 28 and 29. In general, the purpose of the randomly looped filament in FIG. 7 is to increase resistance to tearing.

Figure 8:
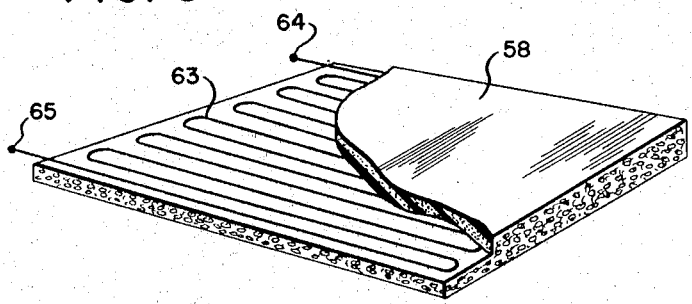
FIG. 8 is a perspective view partly broken away of yet another embodiment of reinforced foam according to the invention.

In FIG. 8, another embodiment of the new reinforced polyurethane foamed sheet is shown in which the reinforcing srand is an electrically conductive wire 63 laid in continuous loops without crossing in contact with itself. At the desired point along the length of such strip, the ends of wire may be brought out and formed with suitable electrical terminals 64 and 65.

The embodiment of FIG. 8 constitutes a type of electrically heated element which may be used as a heating pad, blanket, wrapping or the like. The wire 63 may be laid back and forth as shown by any conventional traversing feed mechanism, or it may be disposed in any other suitable arrangement. If laid back and forth as shown, more than one such wire may be so disposed in respective longitudinal zones of the sheet so that several strips of the product may be taken from a given sheet. Alternatively, a plurality of wires may be laid side-by-side as in the FIG. 6 embodiment, and thereafter the extended sheet may be cut to length and the exposed ends of adjacent pairs of the wires may be electrically bridged to permit current to pass from one wire to the other through the sheet. Actually, any pattern of electrically conductive wires embedded within the unitary foam sheet is suitable for the heating pad herein contemplated, so long as a continuous circuit is established within the sheet. If desired, such heating pads may be further strengthened by the addition of any one of the previously described non-metallic reinforcing layers.

I claim:

1. In a method of making a unitary single sheet of flexible polyurethane foam having a unitary and continuous cellular structure throughout wherein a liquid polyurethane foaming mixture is continuously prepared and chilled below room temperature to a temperature at which it will not react to delay foaming thereof, spreading the chilled mixture onto a moving flexible carrier web, directing a moving flexible covering web over the foam mixture to position the mixture between the carrier and covering webs, fixing a uniform thickness of the chilled foam mixture between the carrier and covering webs, raising the temperature of the foam mixture to react the mixture and form a foam sheet between the webs, directing the webs with the foam therebetween into a preliminary heat-curing zone, separating the carrier and covering webs from the foam sheet, and directing the foam sheet to a final curing operation, the improvement in combination therewith of reinforcing the foam sheet with a flexible discontinuous reinforcing layer embedded within said foam sheet and extending substantially parallel to the broad faces thereof comprising:

(a) feeding a discontinuous layer of spaced reinforcing strands into the liquid foaming mixture at a first position where it is still chilled and before any foaming has occurred, (b) controlling the angle of entry of said reinforcing material into said chilled foam mixture at said first position in relation to its position between the broad faces of the sheet to determine its final location between the broad faces of the sheet so that decreasing the angle relative to one of the broad faces at the first position finally positions the reinforcing angle closer to that face, (c) compressing the carrier and cover webs toward each other at the first position to squeeze excess mixture from between the webs and force the remainder of said mixture fully through and around the strands of said reinforcing layer before foaming of the mixture to fill the interstices and coat the strands with said foaming mixture and thereby entirely enclose the reinforcing layer in the foaming mixture, (d) freeing the webs from said squeezing action at a second position to allow the mixture therebetween to foam, (e) moving the webs, reinforcing layer and foam mixture together at a constant rate, and (f) foaming said mixture in situ into a unitary foamed sheet integrally about and penetrating the interstices between the reinforcing strands so that it possesses substantially the same pore structure within such interstices as on the opposite sides of the reinforcing elements.

2. A method according to claim 1 wherein said first position is defined by a nip between a pair of opposed resilient rolls and compression of webs is effected at the nip of the rolls.

3. A method according to claim 2 wherein the size of the nip is varied depending upon the thickness of the sheet to be formed.

References Cited by the Examiner
UNITED STATES PATENTS

| | | | |
|---|---|---|---|
| 2,648,619 | 8/1953 | Alderfer | 156—78 X |
| 2,841,515 | 7/1958 | Runton | 156—78 X |
| 2,956,310 | 10/1960 | Roop et al. | 156—79 X |
| 3,007,205 | 11/1961 | House | 161—89 X |
| 3,047,449 | 7/1962 | Coble | 156—79 |
| 3,088,539 | 5/1963 | Mathues et al. | 156—79 X |

EARL M. BERGERT, *Primary Examiner.*
CLIFTON B. COSBY, *Examiner.*